United States Patent [19]

Tanaka et al.

[11] Patent Number: 4,922,736
[45] Date of Patent: May 8, 1990

[54] KEY DEVICE INCORPORATING AN ELECTRONIC CIRCUIT

[75] Inventors: Akira Tanaka, Saitama; Takanori Arima; Ryuji Mori, both of Tokyo, all of Japan

[73] Assignees: Honda Giken Kogyo Kabushiki Kaisha; Oki Electric Co., Ltd., both of Tokyo, Japan

[21] Appl. No.: 263,585

[22] Filed: Oct. 27, 1988

[30] Foreign Application Priority Data

Oct. 27, 1987 [JP]  Japan .................................. 62-271154

[51] Int. Cl.[5] ............................................ E05B 47/00
[52] U.S. Cl. ........................................ 70/277; 70/395; 70/408
[58] Field of Search ................. 70/277, 278, 395, 408; 340/825.21; 361/175, 171

[56] References Cited

U.S. PATENT DOCUMENTS

| | | | |
|---|---|---|---|
| 4,322,719 | 3/1982 | Moorhouse | 235/382 |
| 4,562,712 | 1/1986 | Wolter | 70/395 |
| 4,642,734 | 2/1987 | Anderson | 361/380 |
| 4,663,952 | 5/1987 | Gelhard | 70/278 |
| 4,726,205 | 2/1988 | Allerdist | 70/395 |
| 4,734,693 | 3/1988 | Dpuhosch | 70/278 |
| 4,789,859 | 12/1988 | Clarkson | 70/825.31 |

*Primary Examiner*—Robert L. Wolfe
*Attorney, Agent, or Firm*—Skjerven, Morrill, MacPherson, Franklin & Friel

[57] ABSTRACT

A key device including a key main body for actuating a mechanical lock device, a knob fixedly secured to the base end of the key main body, and an electronic circuit incorporated in the knob of the key device, wherein: the electronic circuit is carried by a flexible printed circuit board which is folded around an edge of the base end of the key main body and at least partly cover the two major surfaces of the base end. Thus, even when the size of the base end of the key main body is increased so as to improve the resistance of the knob against the force which tends to pry open the knob due to the twisting torque acting upon the key main body during use, through such efficient utilization of the internal space of the knob, the circuity can be fitted into the knob without increasing its size. Furthermore, the base end of the key main body serves as a heat sink and a firm support for the circuit and the accessory component parts.

5 Claims, 2 Drawing Sheets

KEY DEVICE INCORPORATING AN ELECTRONIC CIRCUIT

TECHNICAL FIELD

The present invention relates to an improvement of a key device incorporating an electronic circuit in the knob of a conventional key.

BACKGROUND OF THE INVENTION

It has been proposed to make unauthorized duplication of a key more difficult by combining a key for actuating a lock device, such as a cylinder lock which can be mechanically locked and unlocked, with a code signal transmitter which, for instance, is provided with a light emitting element, to the end of improving the security against theft and burglary. Such a key system is disclosed in U.S. patent application No. 121,321 and now abandoned by Tanaka who is one of the joint inventors of the present application. A similar key device is proposed in U.S. Pat. No. 4,663,952 by Gelhard.

In such a key device, the electronic circuit and he power source thereof are typically incorporated in the knob provided at the base end of the key. Since the knob is required to be reasonably small for the convenience of the handling, some difficult arises in fitting the circuitry, a push-button switch, a battery and so on in the limited space in the interior of the knob. Further, since the knob is subjected to twisting torques during use, the strength of the mechanical attachment between the knob and the key is desired to be as great as possible.

BRIEF SUMMARY OF THE INVENTION

In view of such problems of the prior art, a primary object of the present invention is to provide an improved key device in which the internal space of the knob is more efficiently utilized than was possible heretofore so that the necessary circuitry may be fitted into the knob without increasing the external dimensions of the knob.

A second object of the present invention is to provide a key device having a knob which incorporates an electronic circuit therein and more securely attached to the key main body than was possible heretofore.

According to the present invention, these and other objects of the present invention can be accomplished by providing a key device including a key main body for actuating a mechanical lock device, a knob fixedly secured to the base end of the key main body and defining a hollow space therein, and an electronic circuit incorporated in the internal space of the knob, wherein: the base end of the key main body is substantially planar, and the electronic circuit is carried by a printed circuit board which is arranged on a major surface of the base end of the key main body.

Thus, the base end of the key, which is received in the knob can be increased in size through efficiently utilization of the inner space of the knob and, thereby, the mechanical strength of the attachment between the key and the knob can be increased.

According to a preferred embodiment of the present invention, the electronic circuit comprises a transmission circuit for transmitting a radiation signal and the knob is provided with a push-button switch for activating this transmission circuit. Since the push-button is firmly supported by the base end of the key main body by way of the printed circuit board, not only the feel of the push-button switch is improved but also the durability of the key device against vibrations and other sources of acceleration is increased.

According to a particularly preferred embodiment of the present invention, the printed circuit board consists of a flexible circuit board which is folded around an edge of the base end of the key main body and covers at least partly the two major surfaces of the base end. Thereby, an efficient utilization of the inner space of the knob is made possible without increasing the external dimensions of the knob. For instance, the printed circuit board and the power source circuit which may include battery cells may be placed in the parts of the circuit board which are located on difference major surfaces of the base end of the key main body.

BRIEF DESCRIPTION OF THE DRAWINGS

Now the present invention is described in terms of a specific embodiment in the following with reference to the appended drawings, in which.

DETAILED DESCRIPTION OF THE PREFERRED EMBODIMENT

Figure 1:
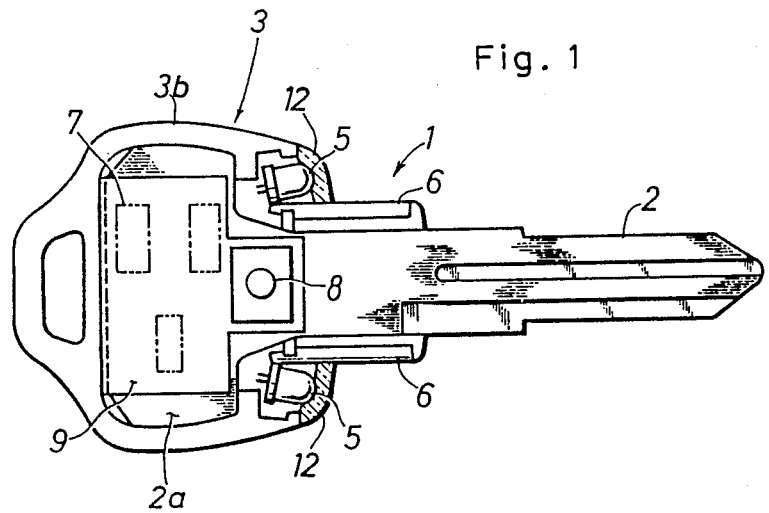
FIG. 1 is a front view of the key device according to the present invention with the front half of the knob portion removed.
Figure 2:
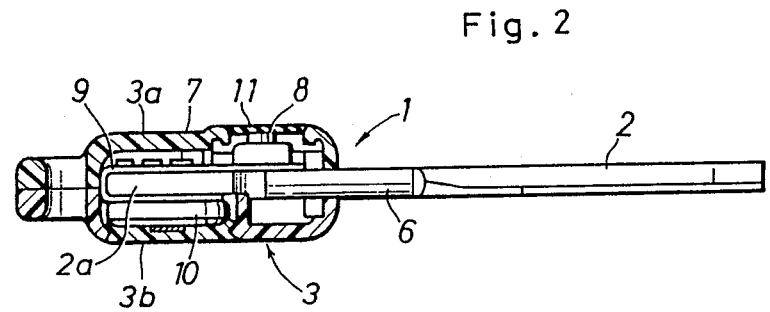
FIG. 2 is a side view of this key device showing the knob portion thereof in section.
Figure 3:
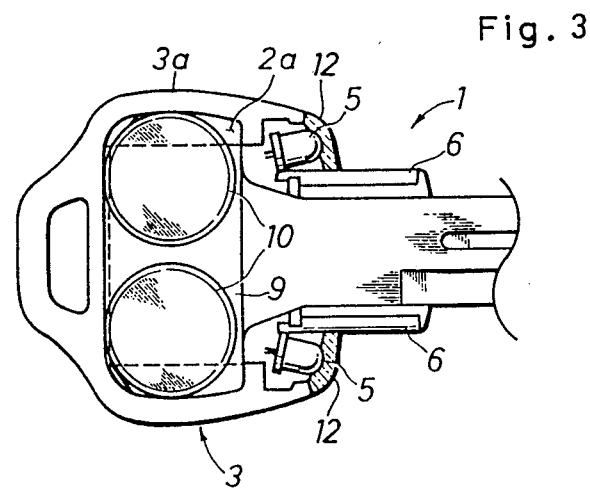
FIG. 3 is a rear view of this key device with the rear half of the knob portion removed.

FIGS. 1 through 3 illustrate an embodiment of the vehicle key device 1 according to the present invention. This key device 1 consists of a key main body 2 for locking and unlocking a lock device such as a conventional cylinder lock, and a knob portion 3 which consists of two halves 3a and 3b and additionally serves as a casing for accommodating an electronic circuit therein. The two halves 3a and 3b are made of synthetic resin material and joined together through a bonding agent, a snap engagement or any other suitable means, securely interposing the base end 2a of the key main body 2 therebetween. Thus, the user of this key device 1 can hold the knob portion 3 with his fingers and can insert the key main body 2 into the key hole of a lock device.

A pair of light emitting elements 5 are provided in the knob portion 3 adjacent to the base end of the key main body 2 on either side thereof. These light emitting elements 5 may consist of, for instance, LED's, and their optical axial lines are directed toward the tip end of the key main body 2 with a slight divergent angle defined therebetween, through transparent windows 12 fitted in the knob portion 3.

The side edges of the key main body 2 are each provided with a contact 6 which can electrically contact a corresponding contact 23 (FIG. 4) provided on the side of the ignition switch of the vehicle as described hereinafter. By means of this contact structure, the key device 1 can receive a supply of electric power from the vehicle when the key device 1 is fitted into the key hole.

A flexible printed circuit board 9 is folded onto the two faces or the two major surfaces of the base end 2a of the key main body 2 with its folding line defined by the edge of the base end 2a facing away from the tip end of the key main body 2. The flexible printed circuit board 9 may be bonded to the surfaces of the base end 2a with a suitable bonding agent such as epoxy resin. The part of the printed circuit board 9 located on the front face of the base end 2a of the key main body 2 carries thereon not only a code transmission circuit 7 for activating the light emitting elements 5 as required but also a push-button switch 8 which may be pressed by way of a rubber membrane 11 fitted in the front half 3a of the knob portion 3 to activate the code transmission circuit 7. The part of the circuit board 9 on the other face of the base end 2a of the key main body 2 carries a power source which includes a pair of rechargeable battery cells 10.

Figure 4:
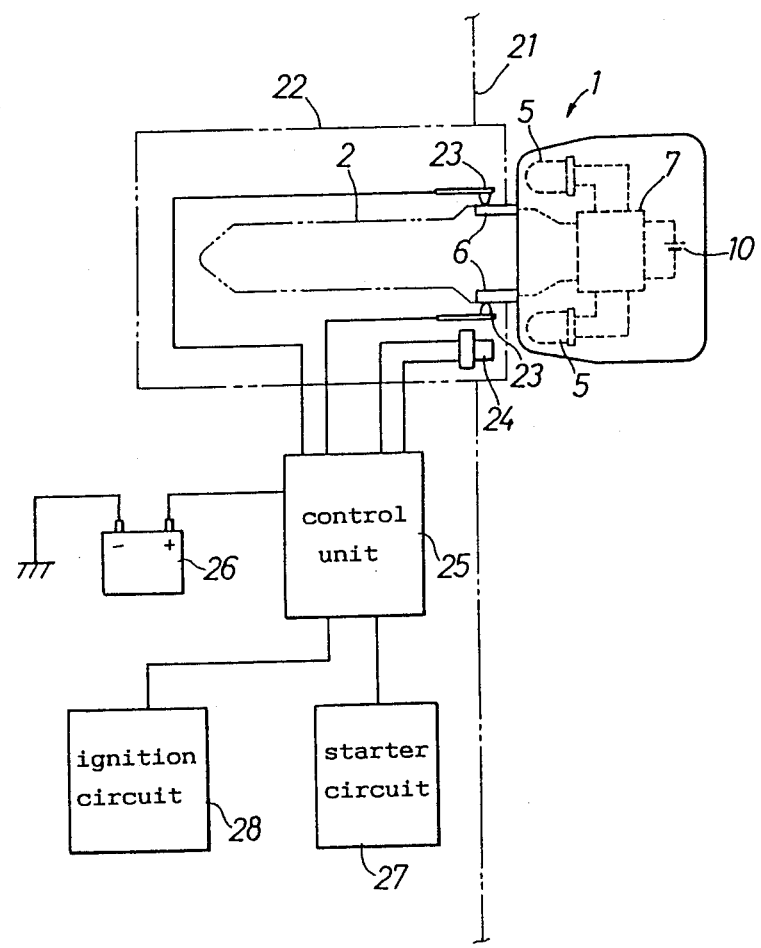
FIG. 4 is a block diagram of an example of antitheft system to which the present invention may be applied.

FIG. 4 schematically shows a part of the vehicle engine control circuit to which the key device 1 is applied. The steering column of the vehicle 21 is provided with a key switch 22 which is integrally formed with a steering lock and and serves as an ignition switch. The key switch 22 is provided with a pair of corresponding contacts 23 which are so disposed as to come into contact with the respective contacts 6 of the key main body 2 fitted into the key hole of the key switch 22, and a light receiving element 24, which may, for instance, consist of a phototransistor and is adapted to receive the light from the light emitting elements 5. The contacts 23 and the light receiving element 24 are connected to a control unit 25 provided in the vehicle 21. Further, to the control unit 25 are connected an on-board battery 26 serving as a power source, a starter circuit 27 for starting the engine, and an ignition circuit 28 for controlling the operation of the engine of the vehicle 21.

The key switch 22 is provided with the positions of "LOCK", "OFF", "ACC", "ON", and "ST" in the same manner as in a conventional vehicle key switch, for controlling the starter circuit 27, the ignition circuit 28 and other on-board equipment not shown in the drawings. The light emitting element 24 is placed at an intermediate angular position between the positions "ON" and "ST" to oppose one of the light emitting elements 5 as the key device 1 is turned while it is inserted in the key hole.

In the normal operation of this key switch 22, the key 2 is inserted into the key hole and is turned from the "LOCK" position so as to unlock the steering lock. When the key switch 22 is turned to the position "ACC", the radio and other on-board circuits are activated.

When the push-button switch 8 is pressed while the key 2 is being turned from the position "ON" to the position "ST", a coded light signal is emitted from the light emitting elements 5. This coded light signal is received by the light receiving element 24, and this coded light signal is compared in the control unit 25 with a code stored in the control unit 25. When they agree each other, an ON signal is generated from the control unit 25 and is sent to the starter circuit 27 and the ignition circuit 28. Thus, various on-board circuits are activated according to the state of the switch circuit of the key switch 22 which depends on the angular position of the key main body 2 inserted in the key hole, and the engine is eventually started.

At the same time, the contacts 6 of the key main body 2 and the corresponding contacts 23 of the key switch 23 into mutual contact, and the electric power from the on-board battery 26 is supplied to the internal battery cells 10 of the key device 1 by way of the control unit 25.

Since the light emitting elements 5 are arranged in symmetric arrangements about the axial line, the key main body 2 may be inserted into the key hole in either of the two mutually inverted orientations.

This key device 1 is desired to be as small as possible for the convenience of being carried with the user, and, at the same time, the mechanical strength of the attachment between the key main body 2 and the knob 3 is desired to be as great as possible so as to better withstand the twisting torques which are applied to the key device 1 during use. Hence, according to the present invention, the size of the base end of the the key main body 2a can maximized whereby the force which tends to pry open the two halves of the knob portion away from each other due to the twisting torque acting upon the key main body 2 is reduced, and the attachment between the knob portion 3 and the key main body 2 is made more secure. Even though a considerable part of the internal space of the knob portion is thus occupied by the base end of the key main body of an increased size, since the printed circuit board 9 is placed over the two faces of the base end 2a of the key main body 2 around an edge thereof, and the space within the knob portion is efficiently utilized, the necessary circuitry and the accessory parts can be accommodated in the knob portion without increasing its external dimensions.

Further, when the circuit board 9 is laid over the whole surfaces of the base end 2a of the key main body 2 as mentioned above, the heat problem of the integrated circuit devices can be controlled by dissipating the heat generated from the various component parts of the circuitry from the base end 2a of the key main body 2 which serves as a heat sink. Also, since the base end of the key main body 2 provides a firm support for the push-button switch 8, the feel of the push-button switch is improved. Also, by firmly supporting the push-button switch 8, the battery cells 10 and other component parts, durability of the system against vibration and other sources of acceleration is improved.

The present invention is not limited by the above described embodiment, but may also be applied to the key switches for other control equipment, and even to those for buildings and storage facilities.

What we claim is:

1. A key device including a key main body for actuating a mechanical lock device, a knob fixedly secured to the base end of said key main body and defining a hollow space therein, and an electronic circuit incorporated in said internal space of said knob, wherein:
    said base end of said key main body is substantially planar, and said electronic circuit is carried by a printed circuit board which is arranged on a major surface of said base end of said key main body.

2. A key device as defined in claim 1, wherein the knob is provided with a push-button switch which comprises a switch main body which is attached to said printed circuit board.

3. A key device as defined in claim 2, wherein said electronic circuit comprises a transmission circuit for transmitting a radiation signal.

4. A key device as defined in claim 1, wherein said printed circuit board consists of a flexible circuit board which is folded around an edge of said base end of said key main body and at least partly cover the two major surfaces of said base end.

5. A key device as defined in claim 4, wherein a part of said printed circuit board is placed on one of said two major surfaces of said base end of said key main body defines a power circuit which includes a contact for an internal battery while the other part of said printed circuit board placed on the other major surface of said base end of said key main body defines a main part of said electronic circuit.

\* \* \* \* \*